United States Patent [19]

Copley

[11] 4,359,330
[45] Nov. 16, 1982

[54] SELF-CLEANING PULSED AIR CLEANER WITH INTEGRAL PRECLEANER

[75] Inventor: George A. Copley, Farmington, Minn.

[73] Assignee: Donaldson Company, Inc., Minneapolis, Minn.

[21] Appl. No.: 242,999

[22] Filed: Mar. 12, 1981

Related U.S. Application Data

[63] Continuation-in-part of Ser. No. 195,873, Oct. 10, 1980.

[51] Int. Cl.³ .............................................. B01D 46/04
[52] U.S. Cl. ........................................ 55/273; 55/302;
55/521; 55/324; 55/DIG. 37; 55/96
[58] Field of Search .................... 55/96, 97, 302, 320,
55/310, 313, 337, 334, 335, 420, 442, 443, DIG.
37, 497, 521, 499, 273, 324

[56] References Cited

U.S. PATENT DOCUMENTS

| 3,402,531 | 9/1968 | Farr . | |
|---|---|---|---|
| 3,487,625 | 1/1970 | Lucas . | |
| 3,509,698 | 5/1970 | Medcalf et al. . | |
| 3,541,764 | 11/1970 | Astrom | 55/337 |
| 3,837,150 | 9/1974 | Kubiak . | |
| 4,129,429 | 12/1978 | Humbert, Jr. . | |
| 4,174,204 | 11/1979 | Chase | 55/302 |
| 4,187,091 | 2/1980 | Durre et al. . | |
| 4,218,227 | 8/1980 | Frey . | |
| 4,225,328 | 9/1980 | Stiehl . | |
| 4,227,903 | 10/1980 | Gustavsson et al. | 55/302 |
| 4,272,262 | 6/1981 | Britt et al. | 55/302 |

FOREIGN PATENT DOCUMENTS

| 248453 | 3/1961 | Australia . | |
|---|---|---|---|
| 447061 | 3/1948 | Canada | 55/DIG. 37 |
| 17590 | 10/1980 | European Pat. Off. | 55/320 |
| 1563990 | 3/1969 | France | 55/DIG. 37 |
| 2401690 | 3/1979 | France . | |
| 1016556 | 1/1966 | United Kingdom . | |

OTHER PUBLICATIONS

American Air Filter EC-1-115B "Pulse-Clean: Air Filters for Turbine Intake Applications".
Donaldson Gas Turbine Product News, Bulletin 3000-9 (1974) and Bulletin 1200-239 (1974), "Slim Vee Pac-2, Non-Stop Protection for Locomotive Engines".

Primary Examiner—Bernard Nozick
Attorney, Agent, or Firm—Merchant, Gould, Smith, Edell, Welter & Schmidt

[57] ABSTRACT

An air cleaning method and apparatus is disclosed in several embodiments. In one set of embodiments, there is described an air cleaning method and apparatus in which air to be cleaned is drawn toward and through a filter in a particular direction. Periodically, reverse pulses of air are directed through the filter in a direction opposite to normal flow to interrupt the flow of air and to dislodge collected particles from the uncleaned air side of the filter and to enable migration of the particles toward the downstream lower end of the filter.

In accordance with other embodiments of the present invention, there is described the addition of inertial precleaner devices located proximate the unfiltered side of each filter for inertially separating heavy particulate matter from the uncleaned air prior to filtration. In addition, the inertial precleaner devices may have closure means operable during the periodic reverse pulse cleaning to remove the dislodged collected particles and prevent reentrainment on the filter.

14 Claims, 22 Drawing Figures

SELF-CLEANING PULSED AIR CLEANER WITH INTEGRAL PRECLEANER

CROSS REFERENCE

This application is a continuation in part of an application entitled "Self-Cleaning Pulsed Air Cleaner" filed Oct. 10, 1980, Ser. No. 195,873.

TECHNICAL FIELD

This invention relates to the field of air cleaning by removal of particulate matter such as dust, particularly in installations requiring treatment of large volumes of air.

BACKGROUND OF THE INVENTION

The removal of dust is accomplished by passing the air through a filter of material permeable to flow of gas but not to passage of particulate matter, which collects on the filter thus gradually filling its pores and increasing the restriction of the cleaner, that is, the pressure drop across the filter and the load on the air-moving fan or blower. A successful air cleaner must accordingly have a large enough area of filter medium to reduce the initial restriction to an acceptable level, and must be either cleaned or replaced at sufficiently frequent intervals to prevent dirt buildup to a point where the restriction is adversely affective.

Means have been devised for cleaning filters, even without interrupting system operation, by mechanical shaking or by reverse air jet pulsing. The latter cleaning procedure is successful, when the filter medium is pleated paper, in releasing the particulate matter from the medium, but the resumption of normal airflow through the filter at the end of each pulse in large measure draws the particles back against the filter medium, thus greatly reducing the cleaning efficiency. This is particularly noticeable in installations which because of the large volume of air to be treated require large areas of filter medium.

BRIEF SUMMARY OF THE INVENTION

One aspect of the present invention relates to an air cleaner with pulse jet cleaning in which the filter medium is positioned and the gas flow is directed so that particulate matter initially impinging on the filter medium is enabled and impelled to "migrate" across the medium during successive cleaning pulses and to ultimately reach a scavenge site where it can be discharged from the cleaner, always without interruption of the cleaning operation.

Other embodiments of the present invention relate to an air cleaner with pulse jet cleaning and an integral precleaner.

In accordance with one of these embodiments, there is disclosed an air cleaner apparatus for removing particulate matter from air comprising a housing having an unfiltered air inlet and a filtered air outlet, a filter assembly within the housing including a filter having a filtered air side and an unfiltered air side, the filtered air side being isolated from unfiltered air, inertial precleaner means located proximate the unfiltered air side and defining an intermediate space therebetween, the precleaner means for reversing the flow of unfiltered air thereby inertially separating particulate matter, reverse pulse cleaning means for intermittently directing a reverse flow of air toward the filtered side of the filter so that particulate matter will become dislodged from the unfiltered air side and enter the intermediate space, closure means responsive to the reverse flow of air for blocking passages of the reverse flow through the inertial precleaner means, and an outlet means in said intermedate space for exhausting the reverse flow of air so that particulate matter in the flow will not be reentrained on the unfiltered side of the filter.

In accordance with other aspects of the invention, there are disclosed a number of embodiments relating to closure means described above and one embodiment having the above elements without the inertial precleaner means.

There have this been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other structures for carrying out the several purposes of the invention. It is important, therefore, that the claims be regarded as including such equivalent structures as do not depart from the spirit and scope of the invention.

BRIEF DESCRIPTION OF THE DRAWING

In the drawing, wherein like reference numerals refer to like elements throughout the several views.

DETAILED DESCRIPTION OF THE INVENTION

Figure 1:
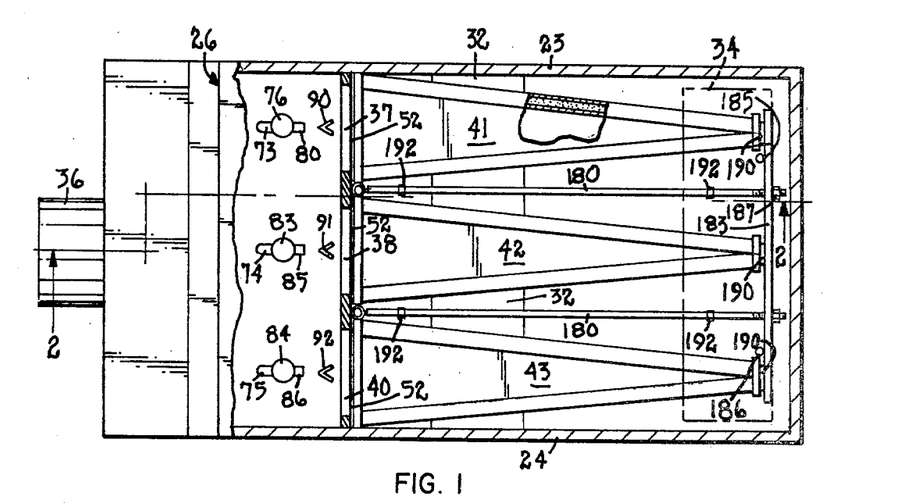
FIG. 1 is a plan view of an air cleaner according to the invention, parts being broken away.
Figure 2:
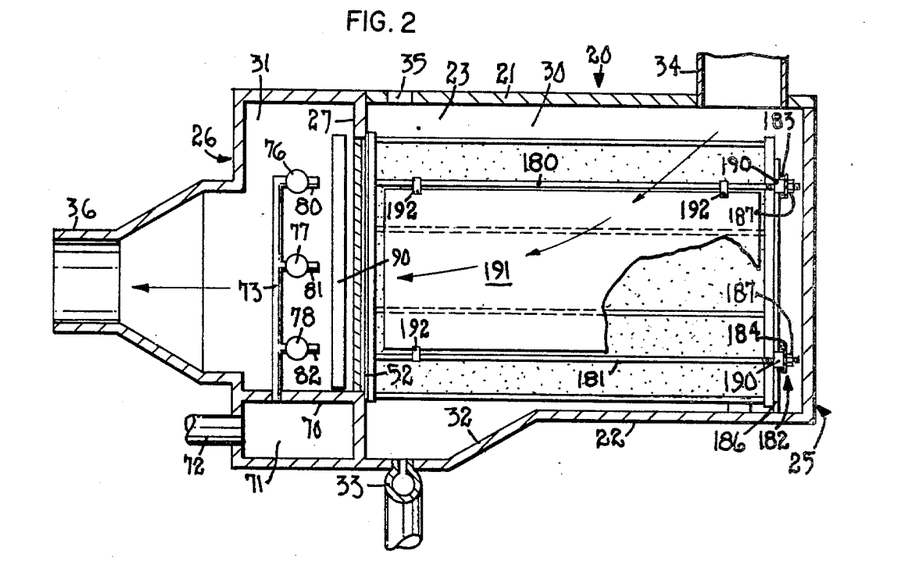
FIG. 2 is a view generally in vertical section looking along the line 2—2 of FIG. 1.

The embodiment of the invention shown in FIGS. 1 and 2 comprises an airtight housing 20 having a removable or hinged top 21, a bottom 22, opposite sides 23 and 24, opposite ends 25 and 26, and a vertical partition 27 which divides the housing into a larger chamber 30 and a smaller chamber 31. Bottom 22 is configured to provide a scavenge chamber 32 to which there is connected a scavenge duct 33. An inlet 34 for air to be cleaned is provided in top 21 near end 25, which is closed, and a draft opening 35 may be provided in top 21 opening into chamber 30 near partition 27. An outlet 36 for cleaned air is formed in end 26. Partition 27 is provided with a plurality of apertures 37, 38, 40 so that a path for air flow extends from inlet 34 through chamber 30, apertures 37, 38 and 40, and chamber 31 to outlet 36, as suggested by the arrows in FIG. 2.

A plurality of filter assemblies 41, 42 and 43 are mounted on partition 27 to close openings 37, 38, and 40. To accomplish this an upper rod 180 and a lower rod 181 are secured at first ends to partition 27, between filters 41 and 42, and a second pair of rods are similarly secured between filters 42 and 43. A clamping frame 182 comprising upper and lower horizontal channels 183 and 184 and vertical legs 185 and 186 is secured to the rods by nuts 187. Pressure pads 190 are provided between the channels and the filters. Legs 185 and 186 are extended downward to rest on bottom 22. Deflectors 191 of sheet metal are secured to extend vertically between the rods by clips 192, for a purpose presently to be described.

Figure 3:
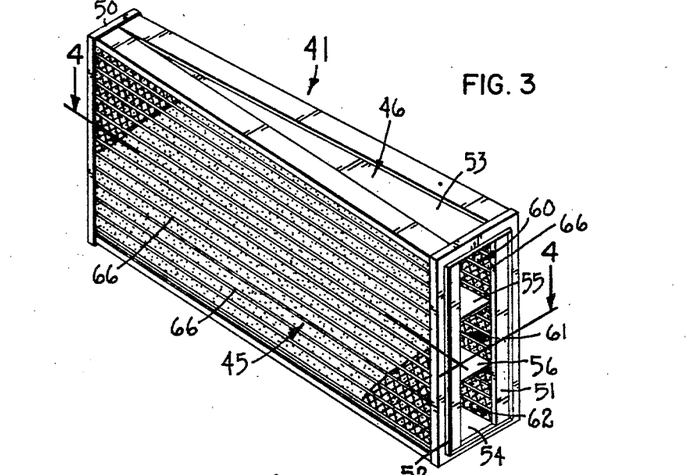
FIG. 3 is a view in perspective of a filter assembly used in the air cleaner of FIGS. 1 and 2.
Figures 4, 5, 6:
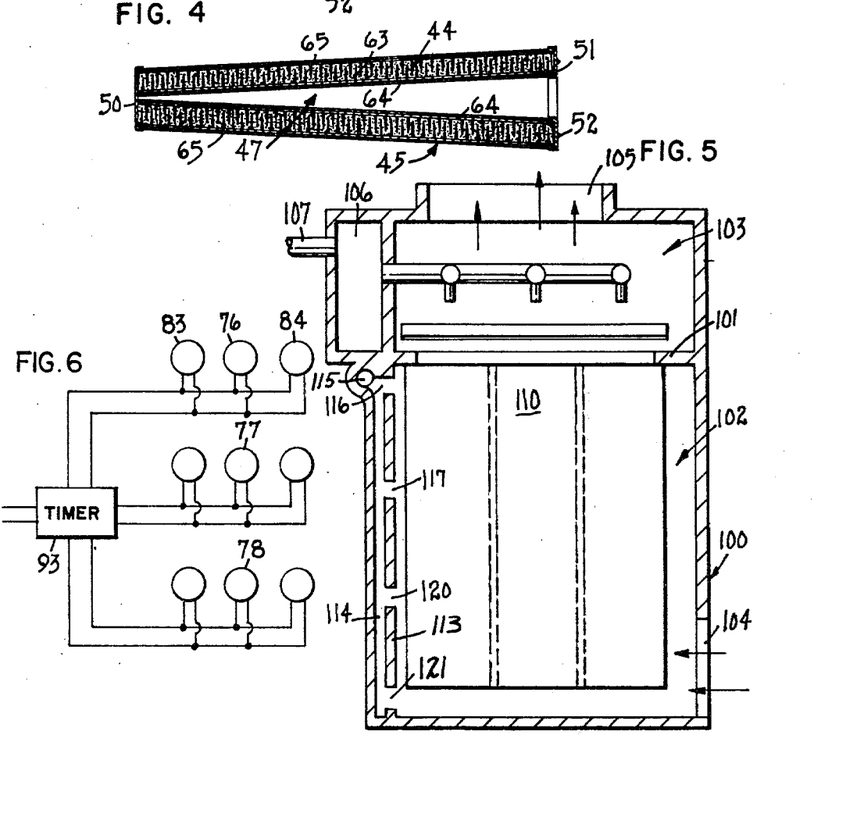
FIG. 4 is a view in horizontal section looking along the line 4—4 of FIG. 3.
FIG. 5 is a somewhat schematic view in section of a second embodiment of the invention.
FIG. 6 is a schematic wiring diagram.

The filter assemblies are alike, and assembly 41 is shown in FIGS. 3 and 4 to comprise first and second flat filters 44 and 45 mounted on edge in a frame 46 with a tapering space 47 between them to converge toward a first, closed end 50 of the frame. The opposite end 51 of the frame is open, and is dimensioned to be seated against one of the openings in partition 27 and be sealed with respect thereto by a suitable gasket 52. A top 53 and bottom 54 of frame 46 are closed, and a pair of horizontal partitions 55 and 56 provide strength and rigidity to the assembly, and divide the tapering space 47 between the filters into an upper chamber 60, a middle chamber 61, and a lower chamber 62.

Each of filters 44 and 45 is made up of a body of pleated paper filter medium 63, contained between inner and outer sheets 64 and 65 of perforated metal or similar material, the whole being unified by stripes 66 of plastic or cement. The pleats of the filter medium run vertically, as is shown.

It will be apparent that assemblies 41, 42 and 43 divide chamber 30 into first and second portions of irregular outline, the first portion being that space outside of the filter assemblies, and the latter portion being the sum of the tapering spaces inside the filter assemblies.

Turning again to FIGS. 1 and 2, a horizontal partition 70 is provided in chamber 31, so that the space 71 below the partition comprises a reservoir for air for cleaning the filter, which air is supplied through a duct 72. A number of standpipes 73, 74, 75 equal to the number of filter assemblies extend upwardly from partition 70, each supplying air from the chamber to a number of valves equal to the number of chambers in the tapered space 47 of a filter assembly. Thus standpipe 73 is connected to and supports an upper valve 76, a center valve 77, and a lower valve 78. The valves connect with nozzles 80, 81, and 82 respectively, and are positioned so that the nozzles are directed centrally into chambers 60, 61, and 62 of the apposed filter assembly 42. Standpipes 74 and 75 are similarly equipped with valves and nozzles, of which valves 83 and 84 and nozzles 85 and 86 are shown in FIG. 2.

Between the nozzles and partition 27 are mounted a set of diffusers 90, 91, and 92, aligned with standpipes 73, 74, and 75 respectively. The partitioning of the filter assemblies into vertically arranged chambers, the provision of plural nozzles, one for each chamber, and the interposition of diffusers between the nozzles and the chambers has been found to optimize the efficiency of pulse jets in releasing particulate matter from the filters, as will be explained below.

Preferably valves 75, 76, etc. are normally closed, solenoid valves actuated electrically at brief intervals to emit pulses of air through the associated nozzles 80, 81, etc.

By a suitable switching circuit suggested in FIG. 6 and including a timer 93 the valves are energized so that jets are directed simultaneously into the upper chambers of the filter assemblies, then into the center chambers, and then into the bottom chambers, in a repeating cycle: the length of the cycle and the lengths of the pulses within the cycle and their spacing may be varied at the will of the operator, to maximize the cleaning effect in dependence on the nature of the particulate matter being removed.

Operation

In operation top 20 is opened and a pluraltiy of clean filter assemblies 41, 42, and 43 are inserted and secured in sealed relation to partition 27. Top 21 is closed, an inlet duct for air to be cleaned is connected at 34, an outlet duct for clean air is connected at 36, a source of air under negative pressure is connected to duct 33, and a source of air under positive pressure is connected to duct 72. To set the cleaner in operation, electrical energy is supplied to timer 93, and airflow through the cleaner is started, ordinarily by a pump or fan connected to outlet 36.

Particles of dirt carried by the air entering the cleaner at 34 are initially collected on the outer surfaces of the filters in assemblies 41, 42, and 43. Timer 93 operates to supply a pulse of air from reservoir 71 through standpipes 73, 74, and 75 and valves 83, 76, and 84 to upper nozzles 85, 80, and 86, which project jets of air past diffusers 90, 91, and 92 into the upper chambers 60 of the filter assemblies, interrupting the flow of air inwards through the filters and momentarily discharging dirt particles from the outer surfaces of the filters. Deflectors 191 are provided to prevent particles expelled from one of the filters from being forcibly jetted across the space between filters to impinge on the adjacent filter. The particles start to descend by gravity into the normal airflow below, but upon termination of the cleaning pulses normal air flow is resumed and the particles are again brought into contact with the filters, at sites lower and nearer to partition 27 than initially. Pulses of air are then supplied in sequence to the center and the lower chambers of the filter assemblies, again dislodging particles of dirt and enabling them to move. The downward movement of particles near partition 27 is facilitated if a small quantity of ambient air is admitted at draft opening 35. The dust particles partake of a motion of migration across the surfaces of the filters and ultimately reach scavenge opening 32, from which they are extracted by duct 33, together with a small quantity of the air entering at 34 and 35.

In one embodiment of the invention the volume of chamber 71 was one cubic foot, cleaning air was supplied at 100 pounds per square inch, and the pressure dropped to 65 pounds per square inch during the pulses. These dimensions will naturally vary with the size of the installation: the one referred to had a capacity of 8,000 cubic feet per minute of air at inlet 34.

Structure of the Second Embodiment

A second embodiment of the invention is shown somewhat schematically in FIG. 5 to comprise a housing 100 divided by a partition 101 into a lower, larger chamber 102 and an upper, smaller chamber 103. Air to be cleaned is admitted to the housing at an inlet 104 near the bottom, and cleaned air is taken from the cleaner at an outlet 105, in its top. A reservoir 106 is supplied with air for the cleaning function by a duct 107, and standpipes, valves, nozzles, and deflectors may be supplied as described above. Filter assemblies such as assembly 110 are supported on and sealed to partition 101, and may be as shown in FIGS. 3 and 4.

Housing 100 is provided with a vertical partition 113 to define a scavenge plenum 114, connected to a scavenge duct 115, and a plurality of apertures 116, 117, 120, and 121 provide communication between chamber 102 and plenum 114.

Operation

The operation of the second embodiment of the invention is as described earlier. Particles of dust initially collecting on the surfaces of the filters, are momentarily released by the cleaning jets, and migrate across the filter surfaces. In this embodiment upward movement is caused by the normal flow of the air into the housing, and movement to the left is caused by the negative pressure maintained in scavenge plenum 114. The drawing shows that no draft opening is provided in this housing, so the cleaner can be used in a system where air is forced into inlet 104 rather than being drawn from outlet 105. In both of the embodiments the matter removed in the scavenge duct is disposed of in conventional fashion.

Alternate Embodiments Including Integral Precleaner

Alternate embodiments of the present invention including an integral precleaner are shown in FIGS. 7-22. Several alternative embodiments within this group of figures are shown and will be explained hereinafter.

Figure 7:
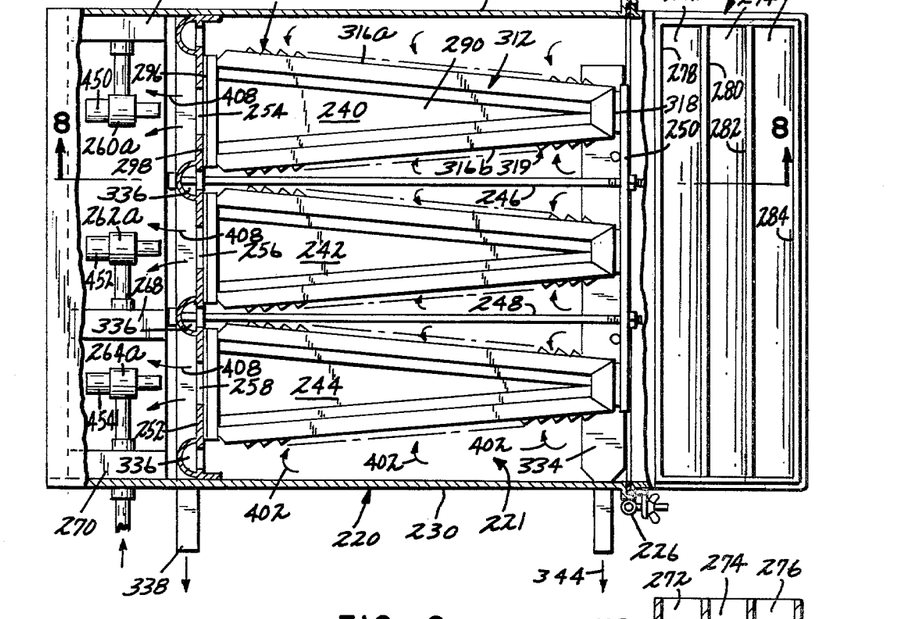
FIG. 7 is a plan view of an alternative embodiment of an air cleaner according to the invention, with parts broken away and shown in section.
Figure 8:
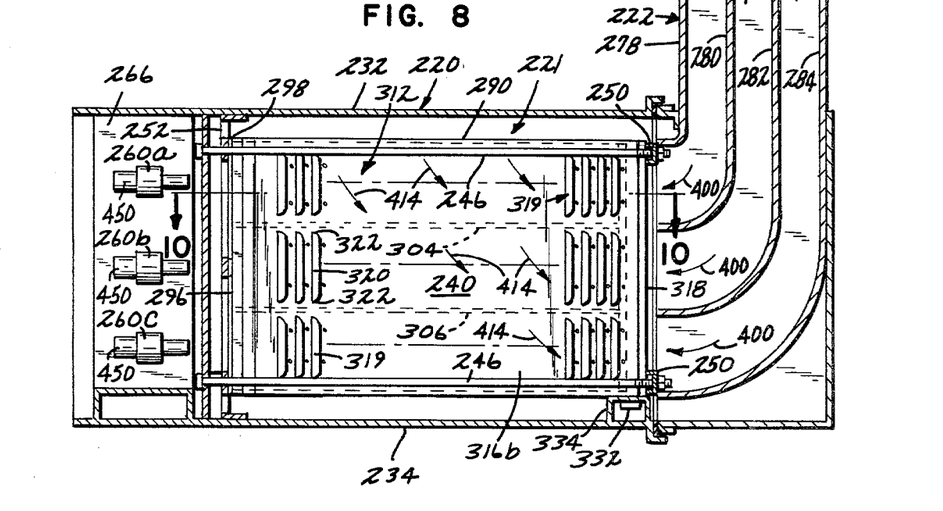
FIG. 8 is a view generally taken in vertical section looking along line 8—8 of FIG. 7.
Figure 9:
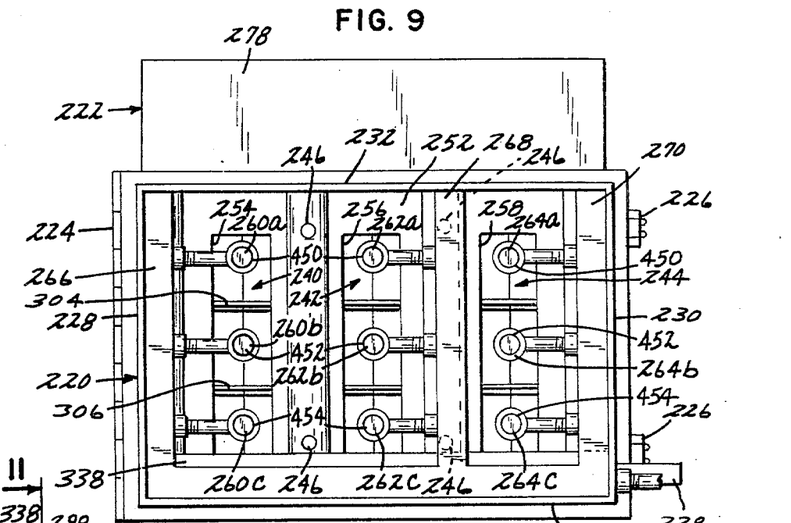
FIG. 9 is an elevational view looking from the left side of FIG. 8.

The embodiment shown in FIGS. 7-13 comprises an airtight housing 220 having a hinged section 222 for intake of unfiltered air which pivots on hinge 224 and is held in a closed position by locking means 226. FIG. 7 shows left wall 228 and right wall 230 while FIG. 8 shows the top wall 232 and the bottom wall 234. Portions 236 and 238 form the side and bottom walls of the hinge section 222.

Within housing 220 are located a plurality of filter assemblies 240, 242, and 244. The filter assemblies are held in housing 220 by bolts 246 and plates 250 and 252 at their respective ends. Plate 252 includes apertures 254, 256, and 258. Located proximate apertures 254-258 are pulse jets 260a–c, 262a–c, and 264a–c. Their relative orientation can best be seen in FIG. 9. Each pulse jet 260-264 is designed to supply a high velocity stream of air for reverse pulse cleaning of the filter assemblies. The pulse jets are of the same general nature as those in the earlier embodiment designated generally by the numbers 73, 76, and 80; however, a diffuser 90 used in the previous embodiment is optional. The pulse jets are connected to conduits 266, 268, and 270, which direct the air therethrough.

Hinge section 222 includes a plurality of passageways 272, 274, 276 which are formed of a plurality of partitions 278, 280, 282, and 284, and which are curved as shown in FIG. 8. The conduits are aligned so as to provide a flow of unfiltered air to the filter assemblies, as will be explained hereinafter.

Figures 10, 11:
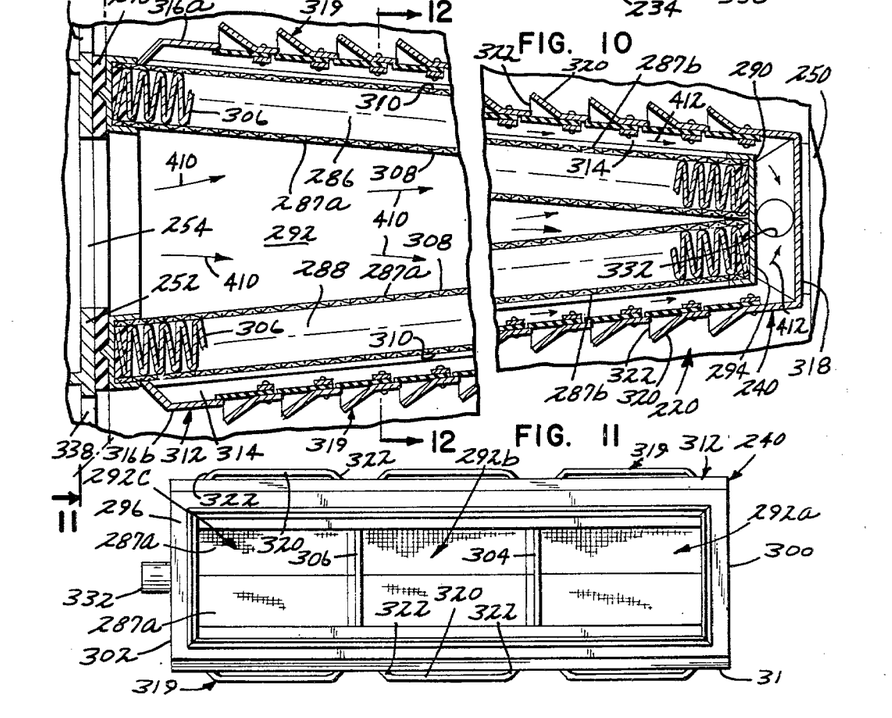
FIG. 10 is an enlarged fragmentary sectional view of a filter assembly as seen from line 10—10 of FIG. 8.
FIG. 11 is a view generally in end elevation looking from line 11—11 of FIG. 10.
Figure 12:
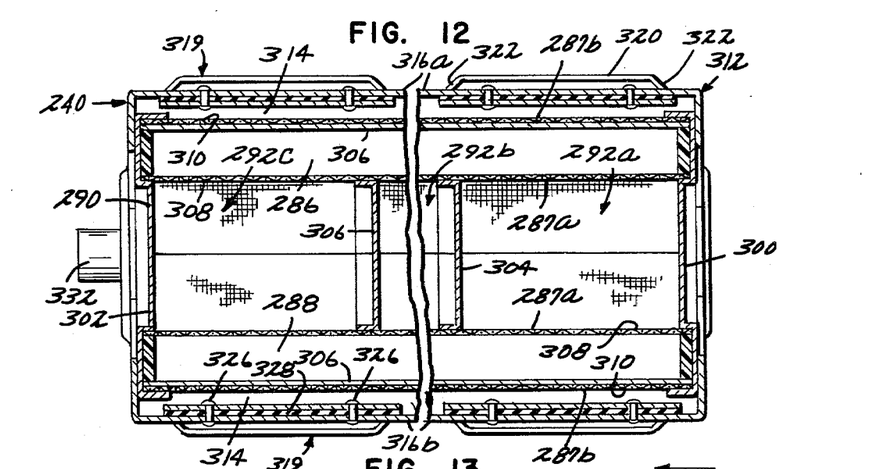
FIG. 12 is a view generally taken in section looking along line 12—12 in FIG. 10.

Turning temporarily to the individual filter assemblies, attention is directed to FIGS. 10-12. Basic components of the filter assemblies 240-244 are the same as assembly 41 shown in FIGS. 3 and 4 of the previous embodiment. To the extent variations are not explained herein, reference should be had to those figures for a detailed description.

All of the filter assemblies are alike. Filter assembly 240 is shown in FIGS. 10-12 to comprise first and second flat filters 286 and 288 (each having a filtered and unfiltered face 287a and 287b respectively) mounted on edge in a frame 290 with a tapering space 292 between them to converge toward a first closed end 294. The opposite end 296 is opened and is dimensioned to be seated against one of the openings 254-258 in plate 252 preferably with a gasket seal 298 to ensure an airtight connection. The top 300 and bottom 302 of frame 290 are closed, thereby enclosing the "filtered" side of the filter assembly, and a pair of horizontal partitions 304 and 306 provide strength and rigidity to the assembly as well as dividing space 292 into an upper chamber 292a, middle chamber 292b, and lower chamber 292c. Each of filters 296 and 288 is made up of a body of pleated paper filter medium 306 contained between inner and outer sheets 308 and 310 of perforated metal or similar material.

Surrounding frame 290 is the precleaner enclosure 312 which surrounds frame 290 on face 287a. Between enclosure 312 and frame 290 there is defined an intermediate space 314. Enclosure 312 includes two louvered panels 316a and 316b which are mirror images of each other and which are joined by a second end panel 318. The remaining portions of enclosure 312 abut frame 290 at gasket 298.

Figure 13:
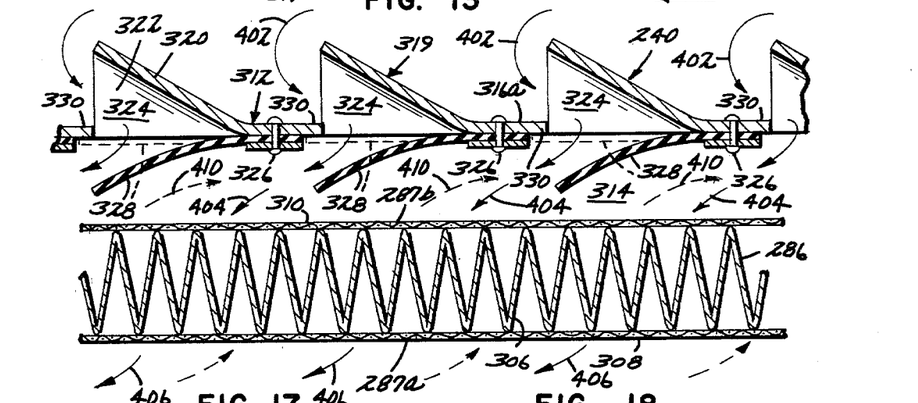
FIG. 13 is an enlarged view of a portion of the louvered structure shown in FIG. 10.

Louvered panels 316a and 316b can be more clearly seen in FIG. 13 of the drawings. In view of the symmetry of panels 316a and 316b, only one will be discussed in detail. Panel 316a includes a plurality of successive louvers 319 which are preferably stamped out of a planar sheet so as to create the overall shapes most clearly shown in FIG. 12, having a rising portion 320 and side sloping portions 322. The angle of inclination of portion 320 relative to the planar sheets 316a and 316b may be predetermined according to desire at manufacture to enhance the precleaning effect according to particular gas densities and pressures to be applied to this device.

Each louver provides a passageway 324 between the intermediate chamber 314 and interior space 221 within housing 220.

Affixed to the other side of plate 312, proximate space 314, by fasteners 326 and flaps 328. Flaps 328 are preferably made of a flexible material, such as rubber or plastic, so that they may move from a position blocking the passageways 324 to a position extending into intermediate space 314 thus opening the passageways in response to air pressure changes within the intermediate space. When flaps 328 are in a blocking position, there will be contact between the flap and end portion 330 of each louver 320.

As can be seen in FIG. 10, within the interior space 314, proximate end 318, a scavenge outlet 332 is provided. The scavenge outlets for each filter assembly 240–244 are collected by a manifold 334 as shown in FIG. 7. As a scavenging outlet for air within the interior space 221, ports 336 are provided (as seen in FIG. 7), which connect to manifold 338, which is ultimately exhausted to the outside environment.

Operation

This embodiment of the present invention effectively provides a dual filtration of uncleaned air and a superior means for reverse pulse cleaning of the filter element.

The first filtration of uncleaned air is accomplished by inertial separation. Uncleaned air enters conduits 272–276 (FIGS. 7 and 8) and enters interior space 221 of housing 220. Arrows 400 in conduits 272–276 indicated the direction of air flow. The air within space 221 will travel in a direction generally toward ports 336. As the air passes through louver 318, it will reverse directions approximately 180° so as to enter passageway 324 as shown by arrows 402 in FIGS. 7 and 13. Because the particulate matter, which is of a greater mass than air, inertial forces of such magnitude are achieved so as to preclude the particles from reversing direction as they pass the louvers, a substantial portion of the heavier particulate matter will be separated out and continue to flow in a linear direction into ports 336. Therefore, the air entering passageways 324 will be precleaned.

The air now enters intermediate space 314 in the direction shown by arrows 404 in FIG. 13. The filtering medium 286 removes most of the remaining particulate matter and allows the air to exit the filter in the direction shown by arrows 406 in FIG. 13. Finally, the clean air will exit the filter through apertures 254–258 in the direction shown by arrows 408 in FIG. 7.

As the filter medium 286 becomes filled with particulate matter, it will be necessary to purge the medium with a reverse pulse of air from pulse jets 260–264. This reverse flow of air is shown by arrows 410 in FIG. 10 and FIG. 13.

During the period when the reverse pulse of air is activated, particulate matter will be blown off the surface of filter medium 286 into intermediate space 314. This reverse pressure will immediately cause flap 328 to become biased against edge 330, thereby closing passageway 324 (FIG. 13). The only remaining path for the reverse pulse of air will then be toward port 332 and into manifold 334. This will effectively sweep this particulate-laden purging air flow out of the system to prevent the major portion of the particulate matter from being relodged on the filter medium. Because flaps 328 are flexible and preferably slightly curved, they will tend to deflect the reverse flow in the direction of port 332 shown by arrows 412. In addition, their flexibility will tend to allow the formation of a greater curvature during the period when they are in the process of closing passageway 324.

In order to provide for continuous operation of the filter, it is not possible to provide reverse pulse cleaning of all sections of the filter simultaneously. By specifically sequencing the portions of each filter assembly which shall be purged, it is possible to cause a general migration of particulate matter in a direction shown by arrows 414 in FIG. 8. By utilizing this migrating effect, the filter assemblies tend to be self-cleaning by ultimately siphoning off the accumulated particulate matter through apertures 332 at the bottom of the intermediate space 314 (see FIGS. 8–10) and by sweeping this matter away through conduit 334 as shown by arrow 344.

Alternate Embodiment

Figure 19:
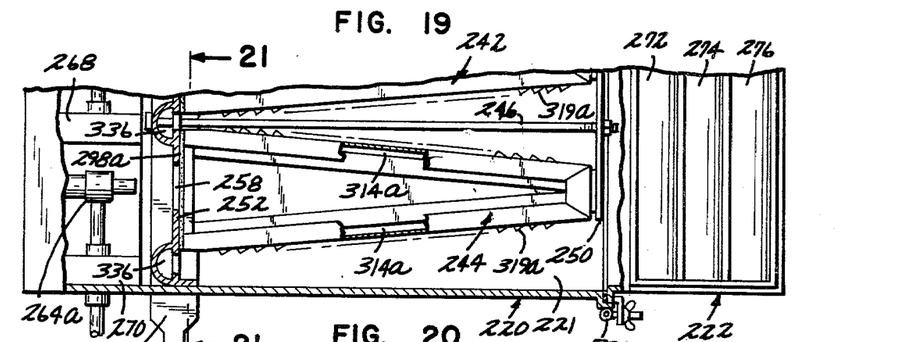
FIG. 19 is a portion of a view similar to FIG. 7 showing a further embodiment of the overall air cleaner according to the invention.
Figure 20:
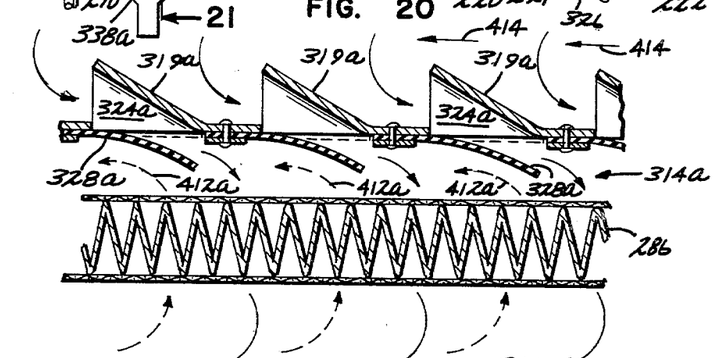
FIG. 20 is a view similar to FIG. 13 showing an alternative embodiment of the louvered structure.
Figures 21, 22:
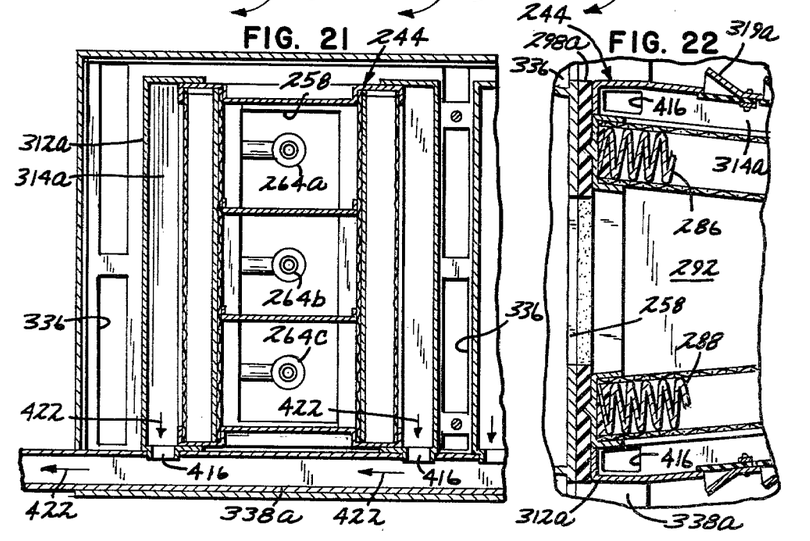
FIG. 21 is a sectional view taken along line 21—21 of FIG. 19.
FIG. 22 is a sectional view similar to a portion of FIG. 10, but showing the alternate form of FIGS. 19 and 20.

The embodiment disclosed in FIGS. 19–21 is considered the preferred embodiment at this time. Many of the features of this embodiment are identical with those of the previous embodiments and will therefore not be reiterated. The changes made in this embodiment over the previous embodiment are shown in FIGS. 19–21. In order to simplify the air flow within intermediate chamber 314a as shown in FIG. 20 and eliminate port 332, flaps 328a have been reversed (see FIG. 13 for comparison). In FIG. 20, it can be seen that each of flaps 328a is fixed to the next leading louver 319a so that the curl of the flap is reversed. As mentioned previously, it is this curvature or curl which aids in urging the reverse air pulse shown by arrows 412a in flowing in a particular direction during the time and after passageways 324a are closing. As can be seen in FIG. 20, the air flow of uncleaned air outside the louvers indicated by arrows 414 and the air flow of the reverse air pulse indicated by arrows 412a is generally in the same direction. This aspect allows for simplification of the scavenging system for intermediate space 314a. As seen in FIG. 22, the termination of plate 312a proximate gasket 298a has been altered as compared with the previous embodiment shown in FIG. 10. In this embodiment, in FIG. 22, ports 416 at the ends of intermediate space 314a provide an outlet passage (FIG. 21) for this flow of air which is collected in manifold 338a. The direction of air flow is indicated by arrows 422 in FIG. 21. It is noted that manifold 338 is the same manifold which collects the heavy particulate matter initially separated in space 221 during the first phase of precleaning. Manifold 338a corresponds substantially to manifold 338 in the previous embodiment shown in FIG. 7.

Thus, by reversing the direction of air flow within intermediate chamber 314a, shown by arrows 412a, as a consequence of the orientation of flaps 328a, it is possible to eliminate port 332 and manifold 334 which were employed in the previous embodiment. The present embodiment uses manifold 338 to collect scavenged air during reverse pulse jet cleaning.

Alternate Embodiment Having Adjustable Louvers

This embodiment of the present invention contains many of the features and elements shown in the previous two embodiments, and to the extent these features or elements are not repeated, they should be considered to be generally the same.

This embodiment allows for the mechanical adjustment of the angle of inclination of the louvers either by mechanical or electromechanical means. This adjustability feature may allow for the elimination of flaps 328 or 328a by mechanically closing louvers 319b (FIGS. 14, 15, and 18) at the appropriate time. In addition, the adjustability of louvers allows selection of the proper angle of inclination to most effectively separate particulate matter of a particular mass carried in a gas at a particular air flow or pressure.

Figure 14:
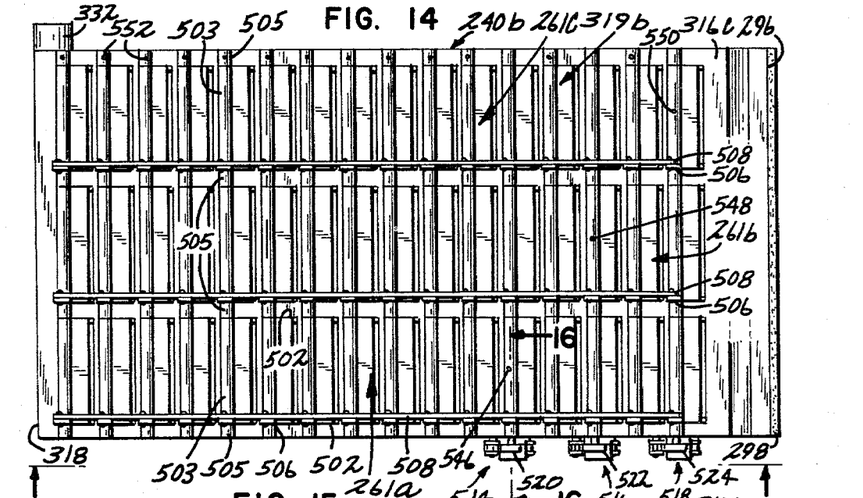
FIG. 14 is a plan view of an alternate louvered portion of a filter assembly used in the air cleaner in FIGS. 7 and 8.
Figure 15:
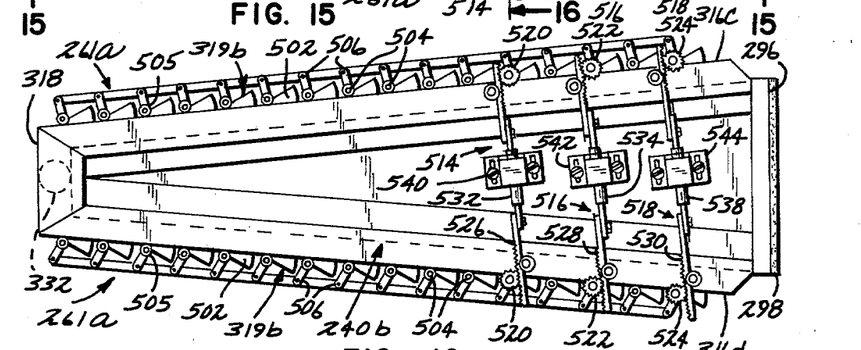
FIG. 15 is an elevational view seen from line 15—15 of FIG. 14.
Figure 16:
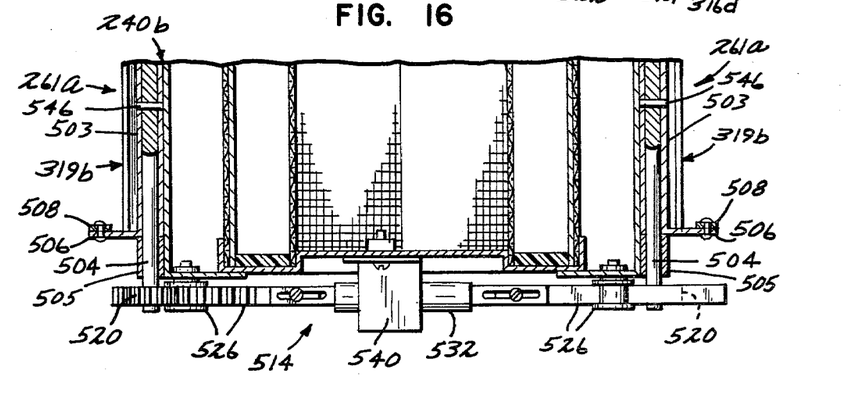
FIG. 16 is a fragmentary sectional view taken along line 16—16 of FIG. 14.

FIGS. 14 and 15 disclose the electromechanical version of this embodiment concerning filter assembly 240b. As in previous embodiments, each filter assembly has two louvered panels 316c and 316d which are symmetric with respect to each other. The louvers 319b are closed at their lateral ends 502. Each louver 319b includes a tubular member 503. The members 503 are axially aligned with cooperating tubular members 505 fixedly carried by panels 316c and 316d. Pivot rods 504 are received within respective cooperating tubular members 503 and 505 to pivotally mount louvers 319b. A lever member 506 is attached to louver 319b and the pivot points each have members 506 pivotably attached to control arm 508. Filter assembly 204b is divided into three sections, 261a, b, and c, as in the previous embodiment.

In order to obtain the migrating effect discussed in the previous embodiment, it is desirable to reverse pulse clean each section sequentially a to c so as to cause particulate matter to migrate towards the bottom of the filter. (Note that FIG. 14 is shown upsidedown). To accomplish this, the louvers of each section are connected together by an individual connecting member 508. Each connecting member is individually operated by rack and pinion systems 514, 516, and 518, respectively, one of which is shown in detail in FIG. 16. Three pivot rods 504 include pinion gears 520, 522, and 524, which have meshing engagement with a rack and roller system 526, 528, and 530 respectively. The roller holds the rack in place while the rack engages the pinion gear. The rack is adjustably connected to solenoid armatures 532, 534, and 538 by means of a fastener through a slot in a portion of the armature. The armature resides within a solenoid 540, 542, and 544, which is adjustably affixed to the filter assembly by means of fasteners in a slotted base. The adjustment of the solenoids allows for presetting the angle of inclination of the louvers. Pinion gear 520 is coupled to the louvers in filter section 261a by pin 546. Similarly pinion gears 522 and 524 are coupled to the next succeeding filter sections by pins 548 and 550. The remaining pivot rods 504 do not rotate themselves and are fixed by pins 552, which pass through tubular members 505 and respective rods 504, as seen in FIG. 14. This allows their respective louvers to rotate freely in response to movement of respective control rods 508.

Figures 17, 18:
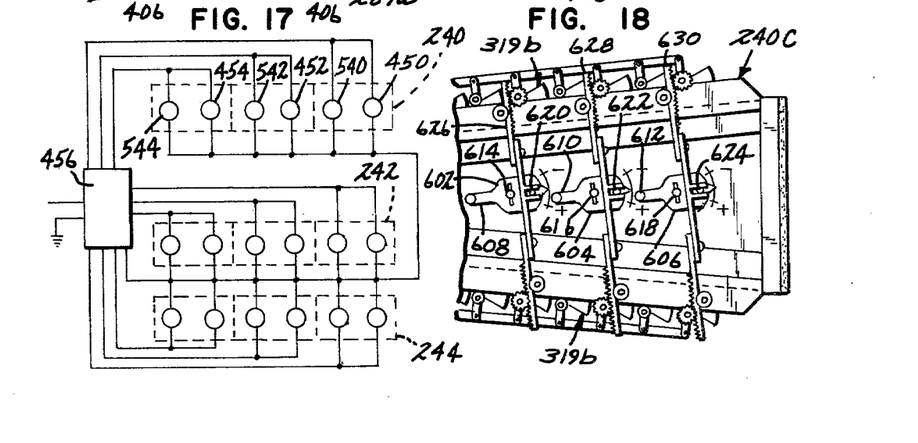
FIG. 17 is a schematic wiring diagram.
FIG. 18 is a view similar to FIG. 15 with portions broken away showing a further embodiment of the present invention.

The circuit shown in FIG. 17, which is used to operate the pulsed jets, may also be coupled to solenoids 540-544 so as to electromagnetically close the proper section of louvers when reverse pulse jet cleaning is being undertaken.

In the circumstance where it is not desired to close louvers 319b but adjustability is an important factor, the manually adjustable system 240c disclosed in FIG. 18 is available. Replacing solenoids 540-544 are plates 602-606, which have integral handles 608-612. The plate is pivoted on pivot points and locking nuts 614-18 as it controls the racks and pinions 626-30 as at 630-24.

Either the electromechanical or the simple mechanical louver-adjusting system disclosed above may be used in conjunction with either of the air flow patterns for the scavenging suggested in the previous embodiment. Therefore, in FIG. 15, port 332 drawn in phantom lines may be eliminated and ports such as 416 in FIGS. 21, 22 substituted therefor.

FIG. 17 discloses a simple schematic diagram of the preferred electrical hookup of solenoid valves 450, 452, and 454 which control pulse jets 260a, 262a, 264a (for 450), 260b, 262b, 264b (for 452) and 260c, 262c, 264c (for 454) and solenoids 540, 542, and 544 etc. which control the louvers. Control box 456 would be in the nature of electronic or electromechanical sequencing means to operate the three parallel circuits in a desired sequence.

It is noted that it is also possible to practice this invention without the precleaner. The embodiments shown in FIGS. 7-13 would be modified by removing the louvers and leaving the passageways and flaps. The device would then have the same reverse pulse cleaning and migration properties of other embodiments described herein.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent of the broad general meaning of the terms in which the appended claims are expressed.

What is claimed is:

1. A cleaner apparatus for removing particulate matter from air, comprising, in combination:
  (a) a housing having an unfiltered air inlet, a filtered air outlet and a scavenge means distant from said inlet whereby an air flow may be established from said inlet to said outlet and from said inlet to said scavenge means;
  (b) a filter assembly within said housing including:
    (1) a filter having unfiltered and filtered sides, said filtered side being isolated from unfiltered air and wherein said isolated side is in fluid communication with said filtered air outlet:
    (2) a louvered precleaner located proximate said unfiltered side and defining an intermediate space between said unfiltered side and said precleaner, said precleaner including a divider plate having a plurality of successive louvers therein, each of said louvers defining a passageway through said divider into said intermediate space, said passageways facing generally in the direction of said air flow from said air inlet to said scavenge means whereby said louvers will cause inertial separation of particulate matter suspended in said air flow;
    (3) a reverse pulsed jet located proximate said filtered air side, said jet intermittently operable to provide a reverse flow of air through said filter and out of said unfiltered side so that particulate matter will become dislodged therefrom and enter said intermediate space;
    (4) closure means responsive to said reverse flow for blocking each of said passageways; and
    (5) outlet means in said intermediate space for putting said space in fluid communication with said scavenge means and for constantly exhausting said reverse flow out of said space so that particulate matter suspended in said flow will tend not to be re-entrained on said unfiltered air side.

2. The apparatus of claim 1 wherein said closure means includes flap means affixed to said divider proximate said intermediate space for closing said passageways in response to said reverse flow.

3. The apparatus of claim 2 wherein said flap means include flexible flaps wherein said passageways are unblocked when said flaps are held in an unbiased state.

4. The apparatus of claim 2 wherein said flaps means are curved for deflecting said reverse flow toward said outlet means.

5. The apparatus of claim 4 wherein said flaps are oriented so that said reverse flow is deflected in the same direction as the flow of unfiltered air into said housing and said outlet means is located downstream of the deflected reverse flow.

6. The apparatus of claim 1 wherein said closure means includes mechanical means for closing said louvers on said divider so that said passageways are thereby blocked.

7. The apparatus of claim 6 wherein said mechanical means includes a pinion gear attached to each of said louvers, a rack gear, and means for moving said rack to open and close said louvers.

8. The apparatus of claim 7 wherein said moving means includes an electromagnetic solenoid responsive to said intermittent operation of said pulse jet.

9. The apparatus of claim 1 wherein the space on said filtered side is divided by dividing means into a plurality of separate chambers, each chamber including an independently operable pulse jet and wherein said louvered precleaner includes a plurality of independent louvered precleaner sections oriented to align with said plurality of chambers, each precleaner section having independently operable closure means which operate in response to to the operation of said pulse jets.

10. The apparatus of claim 9 wherein said independent pulse jets are operated in sequential order in a downward direction so that particulate matter in said intermediate space will tend to migrate toward the lowest of said chambers.

11. A cleaner apparatus for removing particulate matter from air, comprising, in combination:
(a) a housing having an unfiltered air inlet, a filtered air outlet and scavenge means distant from said inlet whereby a air flow may be established from said inlet to said outlet and from said inlet to said scavenge means;
(b) a filter assembly within said housing including:
 (1) a filter having unfiltered and filtered sides, said filtered side being isolated from unfiltered air and wherein said isolated side is in fluid communication with said filtered air outlet;
 (2) a divider located proximate said unfiltered side having a plurality of passageways therethrough and defining an intermediate space between said divider and said unfiltered side;
 (3) a reverse pulse jet located proximate said filtered air side, said jet intermittently operable to provide a reverse flow of air through said filter and out of said unfiltered side so that particulate matter will become dislodged therefrom and enter said intermediate space;
 (4) closure means responsive to said reverse flow for blocking said passageways; and
 (5) outlet means in said intermediate space for constantly exhausting said reverse flow to said scavenge means out of said space so that particulate matter suspended in said flow will tend not to be re-entrained on said unfiltered air side after each reverse air pulse.

12. A cleaner for removing particulate matter from air, comprising, in combination:
(a) a housing having a top, bottom, and first and second horizontally spaced ends and an air inlet, air outlet and scavenge means to establish a flow of air from said inlet to said outlet and from said inlet to said scavenge means;
(b) a filter extending longitudinally in said housing between said first and second ends including:
 (1) a filter element having first and second halves, each half having inner and outer faces, said halves being joined at one end, forming an interior space between said inner faces, said interior space being divided into a plurality of separate regions, and being spaced apart at the other end,
(c) reverse cleaning means directed into each of said regions to intermittently provide a pulse of air toward said regions of said filter so as to momentarily dislodge particulate matter from said outer faces;
(d) dividers interposed between said housing and said outer faces of said filter element halves and defining an intermediate space between said dividers and said outer faces, said dividers having a plurality of passageways therethrough;
(e) closure means for closing said passageways when said reverse cleaning means are activated;
(f) outlet means in said intermediate space for exhausting air from said intermediate space to said scavenge means whereby said dislodged particulate matter may be scavenged from said filter and be prevented from being reentrained on said filter after said pulse.

13. A cleaner for removing particulate matter from said, comprising, in combination:
(a) a housing having a top, bottom, and first and second horizontally spaced ends and an air inlet, air outlet and scavenge means for establishing a flow of air from said inlet to said outlet and from said inlet to said scavenge means;
(b) a filter extending longitudinally in said housing including:
 (1) a generally V-shaped filter element having first and second halves, each half having inner and outer faces, said halves being joined at one end, forming an interior space being divided into a plurality of separate regions, and being spaced apart at the other end,
(c) reverse cleaning means directed into each of said regions to intermittently provide a pulse of air toward said regions of said filter so as to momentarily dislodge particulate matter from said outer faces;
(d) precleaner means proximate each of said outer faces for inertially separating out particulate matter from said uncleaned air constructed so as to cause said uncleaned air to undergo a partial change in direction, thereby enabling the separation of paticulate matter, said precleaner means including:
 (1) louvered dividers located proximate said outer faces of said filter element halves and defining an intermediate space between said dividers and said outer faces, said dividers having a plurality of louvers which provide passageways through said dividers, said louvers being oriented so that said passageways generally face away from the flow of uncleaned air, whereby the uncleaned flowing from said inlet to said scavenge means air must reverse direction to enter said passageways and whereby the heavier particulate matter will be inertially separated;

(e) closure means for closing said passageways when said reverse cleaning means are activated;

(f) outlet means in said intermediate space for exhausting said reverse pulse of air from said intermediate space to said scavenge means whereby dislodged particulate matter may be scavenged from said filter.

14. An apparatus according to claim 12 or 13 wherein said reverse cleaning means includes:

(a) a plurality of reverse pulse jets oriented to provide a reverse flow of air into each of said separate regions, said jets being independently actuable;

(b) means for actuating said jets in sequential order from the highest to the lowest jet so that particulate matter in said intermediate space will tend to migrate toward the bottom of said filter element.

* * * * *